United States Patent [19]

Rahamim et al.

[11] Patent Number: 5,764,694
[45] Date of Patent: Jun. 9, 1998

[54] SELF-TESTING AND EVALUATION SYSTEM

[75] Inventors: Raphael Rahamim, Orange; Jason B. Brent, Foothill Ranch, both of Calif.

[73] Assignee: Rockwell International Corporation, Newport Beach, Calif.

[21] Appl. No.: 590,699

[22] Filed: Jan. 25, 1996

[51] Int. Cl.[6] .................................................. H04B 3/46
[52] U.S. Cl. ........................ 375/224; 375/222; 370/289; 379/406; 379/407
[58] Field of Search ................................. 375/224, 228, 375/219, 222, 254, 295, 296, 316, 227; 370/286, 289, 287; 379/3, 17, 410, 406, 407

[56] References Cited

U.S. PATENT DOCUMENTS

| | | | |
|---|---|---|---|
| 5,008,923 | 4/1991 | Kitamura | 379/407 |
| 5,359,656 | 10/1994 | Kim | 379/407 |
| 5,408,614 | 4/1995 | Thornton et al. | 375/222 |
| 5,512,898 | 4/1996 | Norsworthy | 375/222 |
| 5,579,305 | 11/1996 | Norrell et al. | 370/289 |
| 5,644,594 | 7/1997 | Johnson et al. | 375/222 |
| 5,659,581 | 8/1997 | Betts et al. | 379/406 |

*Primary Examiner*—Wellington Chin
*Assistant Examiner*—Congvan Tran
*Attorney, Agent, or Firm*—William C. Cray; Susie H. Oh

[57] ABSTRACT

A testing and evaluation system for efficiently qualifying individual components of a modem. A modem data pump acts as a dBm meter by measuring distortion, noise floor, and echo. The modem is coupled to a computer and a remote modem. After calibration, the remote modem may be disconnected. A resistor having a preselected resistance is coupled to the modem to allow the computer to measure the modem noise floor and distortion independent of particular telephone connections. An echo canceler coupled to the receive line allows the sum distortion and noise to be measured.

28 Claims, 3 Drawing Sheets

SELF-TESTING AND EVALUATION SYSTEM

BACKGROUND

1. Field of the Invention

The present invention relates to increasing the efficiency and accuracy of trouble-shooting and solving technical problems relating to electronic noise, distortion, and echo of electronic components, namely modem electronics.

2. Related Art

The success of new products and technologies is strongly affected by timing. Particularly, the issue of "time to market" dominates many sales and marketing decisions. It is obvious, however, that the ability to market and sell a product is directly related to whether the product is operational, functional and, therefore, saleable. Essentially, the time to market is significantly affected by how quickly the product can be "qualified." That is, by shortening the time period necessary to accurately test, evaluate, and thus qualify a particular product, the time to market can be substantially reduced. Such qualification, however, can be complex and time-consuming, particularly if it is unclear to the technician from where the problems stem or to what any problems may be attributable.

For example, in the rapidly-evolving area of modem technology, small, high speed, and low cost modems are in strong demand. These technological advances, however, accentuate the weaknesses and potential flaws attributable to certain electronic components within the modem, such as the transformer and surrounding data access arrangement (DAA), as well as other components of the modem. When a modem has poor performance it gives no indication as to the cause. Because the modem alone is unable to distinguish between noise, distortion or uncanceled echo, the typical end result is degradation in performance. Thus, the qualification of the transformer, DAA, and other electronic components within the modem, as well as the prediction of the components' capacity to perform well within the modem, has been found to be a difficult task. It is recognized that many limitations on testing and evaluation are generally attributable to the use of traditional test methods and equipment.

More particularly, high speed modems typically require high performance support circuitry which may include transmission and receiver circuitry, combined in a transceiver, and DAA circuitry. A hybrid coupling circuit, typically called hybrid, couples the modem transceiver to an external telephone line. In such hybrid configurations, two wires extending from the transceiver are designated for output transmission to the telephone line, while an input line leads from the telephone line to the modem receiver.

The hybrid typically includes a transformer coupled between the external telephone line and the transceiver transmit and receive lines. The transformer, however, is associated with several inherent drawbacks, namely, distortion and echo characteristics which could significantly impair the overall modem transmission and reception performance. To minimize distortion, the transformer must be physically large. Accordingly, to maintain the proper transformer ratio, multiple windings around each transformer leg are necessary. The windings, however, tend to produce high internal DC resistance (DCR) within the transformer.

While distortion is a characteristic of the transformer alone, unwanted echo is attributable to a combination of factors including the transformer internal DCR and mismatched impedances between the hybrid circuitry an the external telephone line. Echo, to a certain extent, is a desirable feature of telephone systems. For example, during speech, echo allows the speaker to hear "side tones" of his or her own speaking voice over the telephone receiver. The desirable echo level, however, must be controlled so that the telephone users can hear themselves, as well as each other.

Modems, in contrast, do not require echo. A modem generally does not have to hear itself since a known, discrete amount of data is transmitted or received by the modem without necessitating any intermediate responses. Thus, the modem does not require reflection tones to indicate the speech level, etc. However, due to the internal DCR of the transformer which generally produces mismatched impedances between the transceiver and the telephone line, undesirable reflected echo may be generated. Thus, although it has been found that to minimize distortion, the transformer DCR must be increased, echo is also undesirably increased due to the higher DCR.

Another characteristic of hybrid arrangements is trans-hybrid loss (THL). It has been found that to minimize undesirable echo on the modem lines, the THL must be maximized. As described above, however, the transformer DCR and distortion are inversely related. If the distortion is low, the DCR is high. Yet, a high DCR value result in high echo levels since the THL is dependent on the DCR. The mismatch of impedance within the hybrid causes higher echo which lowers the THL.

Thus, basically, the performance of a modem is highly dependent upon the noise and distortion generated on the printed circuit board which carries the modem's internal data pump (DP), which includes electronic components in integrated circuit form. However, because of the need to support high speeds, the modem cannot tolerate a high noise floor, and due to the noise sensitivity of the modem, described above, expensive and sophisticated test equipment is necessary to measure the noise floor at levels below −80 decibels below one milliwatt (dBm). Unfortunately, it has been found that there are no simple ways to qualify new transformers and other components of the DAA, and predict their capacities to perform properly within the modem.

In conventional schemes, for example, the noise-floor of the modem is typically measured at the input pin of the modem's analog device at which the analog telephone line input signals are received using a dB meter or other measurement tool, such as a spectrum analyzer or oscilloscope. Unfortunately, such measurement results are often inconclusive because the modem noise floor is comprised of many different frequencies. Yet, as described in more detail below, many of these frequencies are not detected, or "seen," by the modem, and therefore may not necessarily be detrimental to the modem's performance. Because the test equipment is external to the modem device, the measurement devices may not be able to report exactly what the modem "sees" across its signal lines. That is, the noise present at the input to the DP may contain frequencies which are harmless to the modem but which can be seen, measured, and reported by the external equipment. Consequently, as a result of the general inconclusiveness of any test results, multiple iterations are required to more accurately assess the outcome of the measurements.

In addition, the leads and probes of the external equipment may themselves introduce noise which can also be seen, measured, and reported by the test equipment in use. This excessive noise clouds the measurement results and thus significantly reduces the accuracy of the results. To overcome such noise problems, comprehensive performance tests are necessary which, if performed properly, often require several days' worth of processing and evaluation. These performance tests must be repeated each time a change is introduced, thereby making every iteration complex and time-consuming.

Furthermore, with regard to the determination of modem transformer distortion, typically, the distortion of the transformer is measured at a given frequency and used to predict the behavior of the transformer in its ultimate position in the modem hybrid. It has been found, however, that this method tends to be inaccurate and inconclusive because the modem transmits and receives a full spectrum of frequencies at a multitude of frequencies simultaneously. As a consequence, the total harmonic distortion (THD) will be substantially higher than the distortion measured at the single frequency. In addition, the THD varies as the technology changes because the transmitted frequency spectrum differs with the data transmission speeds and in accordance with different modem standards, e.g.. V.34 versus V.32. Moreover, the transmitted spectrum may be significantly different among manufacturers of modems implementing the same international standard. Spectral shaping would thus depend upon the signal processing algorithm implemented in the particular modem which differs from one modem manufacturer to another.

SUMMARY OF THE INVENTION

The testing and evaluation system according to an embodiment of the invention is a relatively simple and inexpensive way to improve the time to market, and also to provide an engineering tool for efficiently qualifying individual components of a modem. A modem data pump acts as a dBm meter by measuring what it sees as distortion, noise floor, and echo. In accordance with embodiments of the present invention, the modem is coupled to a preprogrammed host computer and, at least initially, to another modem. A handshake operation is performed between the two modems to allow the modems to train their associated internal echo cancelers in an attempt to minimize the echo riding on the input signal, such that appropriate echo canceling signals can be determined. After a simple calibration operation, the remote modem may be disconnected. A resistor having a preselected resistance is then coupled to the modem input lines (typically 600 ohms) to enable a dBm value to be determined and displayed by the host computer, thus enabling the user to immediately assess the noise floor of the modem.

According to the invention, if a transmit switch in the transmit line is closed, or turned on, thereby allowing the transmitted signal to flow to a hybrid circuit, while the preselected resistor is still coupled to the modem, echo generated at the hybrid that arrives back as the receive signal can be measured at the data pump analog input. By closing an echo canceler switch, an echo canceler trains to a new condition and forms an estimate of the echo, subtracts this from the received signal so that what remains at the receiver is the sum of any uncanceled echo and noise, representing the total distortion created anywhere in the modem arrangement. In particular embodiments of the present invention, the probability distributions of several samples of the receive signal, echo or uncanceled echo are examined to determine relative power and energy levels of echo, noise, and distortion.

DETAILED DESCRIPTION OF THE PREFERRED EMBODIMENTS

Embodiments of the present invention are directed to enabling a modem to perform the functions of a self-test and measurement system such that the modem itself can report absolute levels of noise, distortion, and echo, each individually. A system designer is then able to immediately interpret the readings and pinpoint any problem areas.

Figure 1:
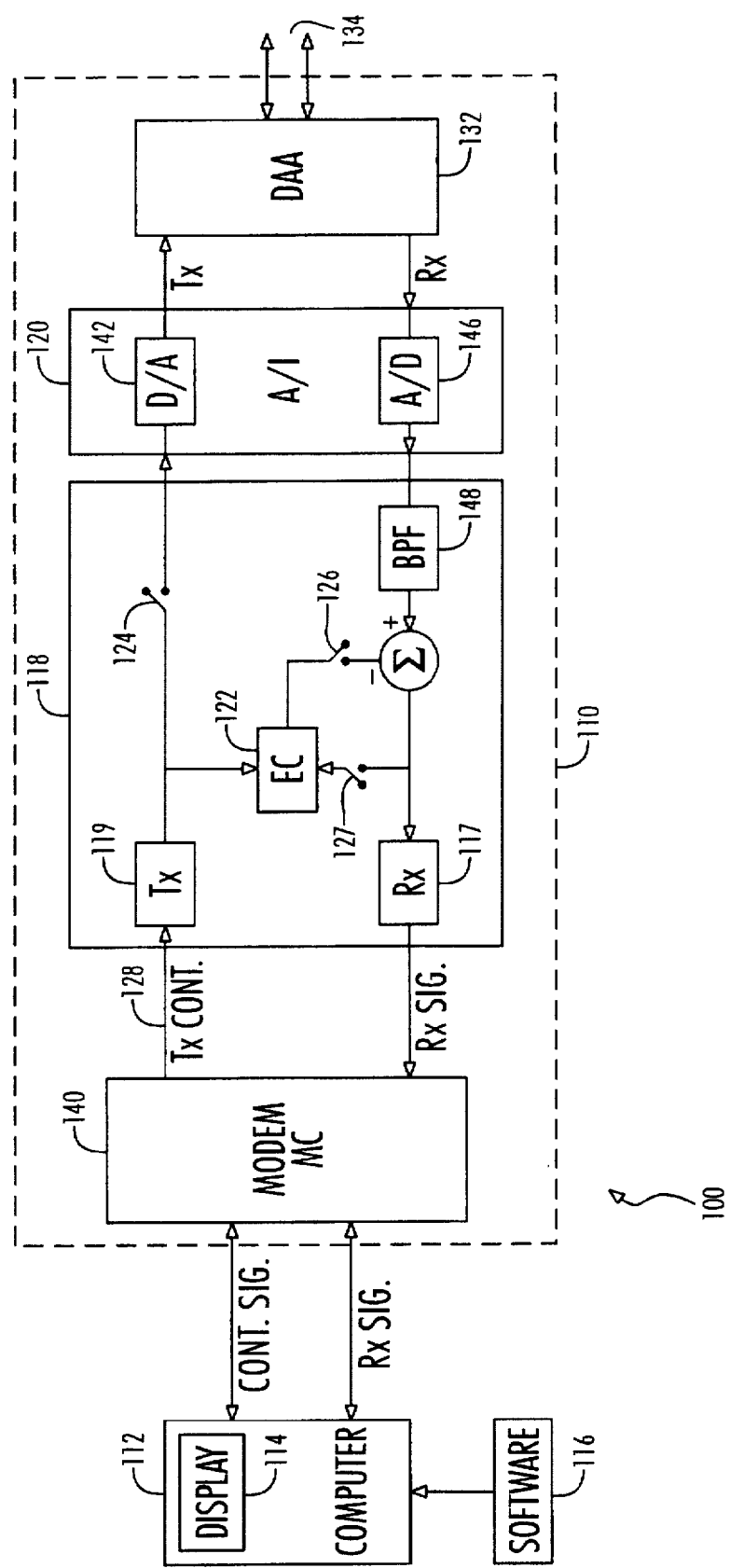
FIG. 1 is a diagram of a modem data pump coupled to a DAA and a host computer according to embodiments of the present invention.

As illustrated in FIG. 1, a modem self-testing and evaluation system is shown generally at 100. According to preferred embodiments of the invention, the system effectively operates as an AC voltmeter to separately measure noise, distortion, and echo levels among the individual components of the modem structure 110. Modem embodiments of the present invention include a modem 110 coupled to a host computer 112 having a display screen 114 or other status indicator. An application program (AP) or software 116 is provided to allow a user to input commands or to automatically instruct the computer to control the operation and switching of the modem components for various testing and evaluation modes.

The modem 110 includes a data pump (DP) 118 coupled to an analog interface 120. The analog interface 120 converts incoming and outgoing data from analog-to-digital and digital-to-analog, respectively. A data access arrangement (DAA) 132 is provided to handle the telephone line. The DAA 132 includes a hybrid circuit (FIG. 2) for separating the receive and transmit signals. As will be discussed in more detail below, the DAA provides 2-to-4 wire conversion to enable coupling between the analog telephone line 134 and the modem 110.

Analog-to-digital (A/D) converters 142, 146 are provided to convert the transmit and receive signals to and from the digital domain. The digital data signal is then processed by the DP 118 which provides the raw receive data (received across the telephone line 134) to the program running on the host computer 112 via the microcontroller 140. Preferably, the DP is provided with a variety of registers, commands, and controls for controlling processing functions, thereby allowing the computer 112 to read its receive data from the data registers. The DP includes a transmitter 119, receiver 117, an echo canceler 122, and operates in conjunction with controllers 128, 130 and other hardware for operating software switches 124, 126 to control the connection of the modem to the appropriate transmit or receive lines.

Thus, the DP 118 essentially performs the tasks of transmit, receive and echo cancellation. Generally, the transmitter 119 shapes the data sequence into a waveform suitable for transmission over the telephone line. The echo canceler 122 removes echo from the transmit signal, while the receiver 117 inverts the spectral shaping of the signal from the far end to reconstruct the original data sequence. The echo canceler has associated echo cancellation coefficients, or taps, which are adjusted to reflect the desired cancellation. The transmit signal is convolved with the EC tap coefficients to provide an echo canceling estimate. This estimate is then subtracted from the actual echo to determine an error signal, which will be fed back into an echo cancellation update algorithm, such as the well-known least mean square (LMS) algorithm, for example, whcih may reviewed in B. Widrow and M. E. J. Hoff, "Adaptive Switching Circuits," IRE, Wescon Conv. Record, pp. 563–87 (1960) and R. W. Lucky, J. Salz, and E. J. Weldon, Jr., *Principles of Data Communication*, McGraw-Hill (1968).

1. Modem signal transmission and reception

In preferred embodiments of the invention, data transmission is controlled by a microcontroller 140 residing within the modem 110. In other modem embodiments, the modem may not include a controller on-board, but rather will utilize the processor of the host computer to perform similar tasks. The host computer 112 acts as the primary user interface to the modem. By providing appropriate computer commands, the microcontroller 140 can control switches TxSw 124 and ECSw 126 which, depending upon the switched configuration, allow the digital (binary) value of the received signal to be forwarded to the computer 112. Preferably, switches TxSw and ECSw are software switches residing in the DP. The switches are controlled in accordance with the AP 116 and/or a user, and are effectively opened and closed by the DP internal code, e.g., by setting a prescribed bit or software switch, depending upon the desired signal transmission or reception.

In addition, another switch 127 may be implemented to control the updating of the EC coefficients in the EC. In preferred embodiments, switch 127 is also a software switch which, when open, freezes the set EC coefficients, and determines feedback error to be zero. When switch 127 is closed, any error in the EC estimate is input and the EC coefficients are updated to reflect the error.

More particularly, referring to FIG. 1, the heart of the modem 110 is the DP 118. The DP 118 processes the signals in the digital domain in contrast to the telephone line 134 which can only carry analog signals. Although the DP processes the input and output signals as separate tasks, these two signals are superimposed on each other on the telephone line, and thus must be separated before processing by the DP. As noted above, the conversion from analog-to-digital and digital-to-analog is performed by the analog interface 120. The DAA is provided to couple the 2-wire telephone line to the 4-wire modem. That is, 2-to-4 wire conversion is performed by the hybrid circuit 200 (FIG. 2) residing within the DAA.

Figure 2:
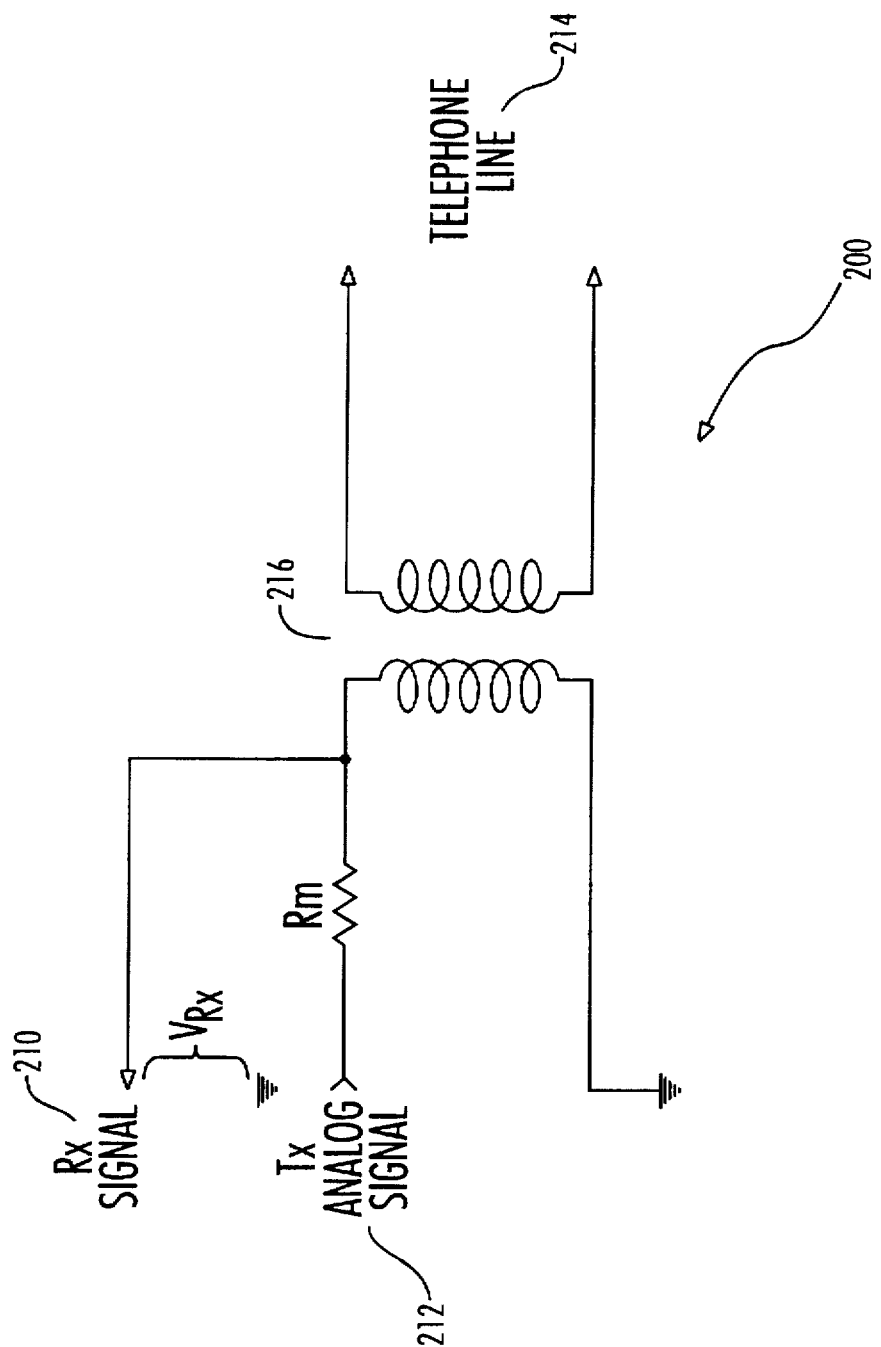
FIG. 2 shows a conventional hybrid circuit including a transformer to perform two-to-four wire conversion.

Referring to FIG. 2, hybrid embodiments include two inputs. At one end, a receive signal is received from the telephone line 214, and sent to the modem via the receive signal line 210. At the other end, a transmit signal 212 may be transmitted by the modem and input into the hybrid for conversion and transmission across transformer 216 to the telephone line 214. More simply, the hybrid 200 merely sends the signal received from the telephone line 214 to the DP (as in FIG. 1), and the transmitted signal 212 to the line 214. Thus, the DAA provides the necessary conversion to enable processing of the transmit and receive signals. As indicated in FIG. 2, the 4-wire transceiver lines comprise the receive and transmit lines with ground reference points.

However, as discussed in the Background section above, it has been found that as a remote signal sent across the telephone line is received at $V_{rx}$ by the local modem, undesirable echo may be generated. As shown in FIG. 2, the hybrid includes a transformer 216, as well as amplifiers and other passive parts (not indicated). It is recognized that transformers, however, have some DC resistance (DCR) in their windings. This DCR contributes to the amount of echo generated by the hybrid. Another component of the reflected echo is attributable to the mismatch between the internal impedance of the modem and the impedance of the telephone line. Consequently, all the echo contributions are combined with the actual receive signal. The DP must remove, i.e., cancel, this echo before the receiver to reliably detect the receive data.

Thus, in preferred embodiments of the present invention, the components of the hybrid are selected such that the internal impedance of the circuit matches that of the telephone line. By varying the resistance of Rm, the impedances can be matched so that reflection of the transmitted signal 212 back to the receiver 210 is minimized. For example, if the telephone line has a 600 ohm impedance and the transformer DCR is 100 ohm in each winding, such that the total DCR is 200 ohms, to match the line a 400 ohm resistor Rm will be necessary according to:

$$R_m = \text{line impedance} - DCR = 600 - 200 = 400 \text{ ohms}$$

In another example, an ideal transformer having no DCR, i.e., DCR=0 ohms, and very low THL, will require an $R_m$ of 600 ohms. When a 600 ohm telephone line is connected to such a hybrid, the receiver 117 (FIG. 1) will receive an echo having a value of $V_{rx}=0.5\,V_{tx}$ because:

$$R_m = R_{line} + DCR = 600 + 0 = 600 \text{ ohms}$$

and $$Vrx = Vtx \frac{R_{line}}{R_m + R_{line}} = Vtx \frac{600}{600+600} = 0.5\,Vtx$$

which shows that even when the telephone line is perfectly matched, there still exists inherent echo that becomes worse when the transformer has associated DCR. When the echo at $V_{rx}$ reaches the DP receiver, it will be superimposed on any incoming signals. However, the incoming signal is expected to be 10 dB to 30 dB lower than $V_{tx}$ due to the loss or signal attenuation between the local and remote modems. Consequently, the echo canceler must cancel the echo so the receiver can detect the incoming signal. Thus, it can be seen that such a hybrid has an inherent echo even when the matching resistance $R_m$ has been perfectly selected to match the line impedance. Other DAA hybrid arrangements which may be implemented in accordance with embodiments of the present invention are discussed in application Ser. No. 08/270,538, entitled "Compensated Hybrid" and filed on Jul. 5, 1994, the disclosure of which is incorporated herein by reference.

Thus, embodiments of the invention allow normal functioning of the host computer, modem and DAA assembly, while also providing for immediate evaluation of the individual components within the modem. Accordingly, testing and evaluation embodiments of the present invention utilize the existing transmit and receive paths of standard data flow within a modem system to provide points along the data paths at which trouble-shooting and system status may be evaluated.

As explained above, the signal to be transmitted by the modem originates at the DP transmitter 119 as a digitally encoded signal. When transmit switch TxSw 124 is closed, the signal flows to the D/A 142 which converts the digital signal to an analog signal, comprised of multiple frequencies typically between 150 Hz and 3400 Hz. The analog signal is then presented to the hybrid circuit in the DAA 132 for 4-to-2 wire conversion. The signal is then transmitted across the telephone line 134. However, as explained above, as the signal passes through the hybrid, undesirable echo is produced as the signal is essentially "leaked" back into the receive side of the hybrid.

On the receive side, the incoming receive signal arrives from the telephone line 134 in analog form. The signal passes through the hybrid 132 and then on to the A/D converter 146 within an analog interface (A/I) 120. This Rx signal contains not only the incoming signal but also the echo contributions described above. The A/D converter 146 converts the analog signal into the digital domain, after which a bandpass filter (BPF) 148 is provided to block out some of the frequencies outside the desired spectrum. The digitized and filtered Rx signal is input into summer 150 before it is passed to the DP 118. At the summation point 150 and before the Rx signal is input into the DP 118, any echo generated at the hybrid or at the telephone line can be canceled by connecting the echo canceler 122 to the receive line. If echo canceler switch (ECSw) 126 is closed, the echo estimate will be routed to summer 150.

The digitized Rx signal, with or without the echo, is presented to the DP 118 which processes the signal and forwards it to the microcontroller 140. The digital value of the signal is then presented to the user via the host computer 112. Preferably, the digital value of the signal is converted to volts or dBm and displayed on the computer screen 114 for immediate evaluation.

As shown in FIG. 1, the echo canceler 122 receives signals transmitted by the host computer 112 and local modem 110, and the received signals sent across the telephone line 134, as well as the echo generated at the hybrid 132. When a connection is established between the local modem 110 and the remote modem (called a handshake, not shown), standard modem protocol allows each modem to transmit for a short time while the other party is muted, or is not transmitting. This connection is generally the initial step by which one modem calls another. Both modems then perform a handshake operation to result in a trained EC. According to preferred embodiments of the present invention, the EC trains to the currently existing echo.

More particularly, during the handshake, the transmitting modem will receive a signal which is the echo. This echo will be seen as an error, which causes the EC 122 to produce a signal having the same magnitude and frequency as the error, but opposite in phase. Consequently, when the ECSw 126 is closed, the output of the EC 122 will be directed into the summation point 150, and thereby reducing the error signal to zero. If the output of the EC 122 is kept at the same level, the receive signal at the input to the DP 118 will not include substantial echo because the echo-generating characteristics, e.g., impedance, of the telephone line 134, as well as the modem hybrid 132, do not change significantly over time.

Thus, the EC 122 is essentially "trained" during the handshake to produce a mirror image of the echo contributions produced by the hybrid and the mismatch of the telephone line. Accordingly, after such training, the EC 122 may be used to provide the DP 118 with a receive signal free of echo. If the ECSw 126 is open, i.e., off, and when the remote modem is not transmitting, the DP 118 will receive a value representing the levels of the echo attributable to the DAA and the mismatched line impedances.

2. Implementation as a dBm meter

In operation, embodiments of the present invention enable the above-described modem to function essentially as an internal operation evaluation/measurement gauge to determine the status and capabilities of individual components within the modem, thus providing for simple and quick trouble-shooting and resolution of problems. Thus, in preferred embodiments of the invention, the modem may be implemented as a dBm meter as described in more detail below. In addition, preferably, the dBm meter will have a linear response, such that upon decreasing the input signal by half, using a signal generator, for example, the digital output of the DP will decrease proportionately.

More particularly, it is recognized that as noise, for example, has a Gaussian, or normal, probability distribution, the amplitude of any single sample will not accurately reflect the power level of the noise. Similarly, individual samples of the receive signal, echo or uncanceled echo will also generally have a Gaussian, bell-shaped probability distribution. Thus, the relative power and energy levels of echo, noise, distortion and uncanceled echo have been found to be more meaningful. However, in order for the application program running on the PC to display a correct and meaningful result, the data reads from the registers within the DP must be averaged according to the following.

To estimate the energy level, the RMS value of the various signals is calculated. In one method, the RMS value is determined over n samples:

$$RMS = \frac{\sqrt{(R_1 * R_1 + R_2 * R_2 + \ldots + R_n * R_n)}}{n}$$

where n consecutive receive samples read from the DP are represented as $R_1, R_2, \ldots R_n$. The RMS value can then be converted to dB according to 20log10(RMS)+C, where C is the calibration constant that provides an equivalent reading as an analog power meter connected to the receive input at the DAA connection with the telephone line. The value of the calibration constant C is determined using standard calibration processes and as described below.

Alternatively, a form of moving average may be more useful to estimate the energy. For example, the RMS value after the Nth sample may be determined by:

$$RMS_N = \sqrt{\frac{r(1)*r(1) + r(2)*r(2) + r(3)*r(3) + \ldots + r(N)*r(N)}{N}}$$

which can be updated N samples later for the RMS value after 2Nth samples to be $$RMS_{2N} = \sqrt{\frac{r(N+1)*r(N+1) + r(N+2)*r(N+2) + r(N+3)*r(N+3) + \ldots + r(2N)*r(2N)}{N}}$$

This moving average can be designed to accurately follow changes in conditions. For example, if the noise floor increases with time as a faulty analog component heats up, the moving average would track such a change. Thus, the moving average can track changes in conditions, as in a traditional analog power meter.

a. Calibrating the dBm meter

Figure 3:
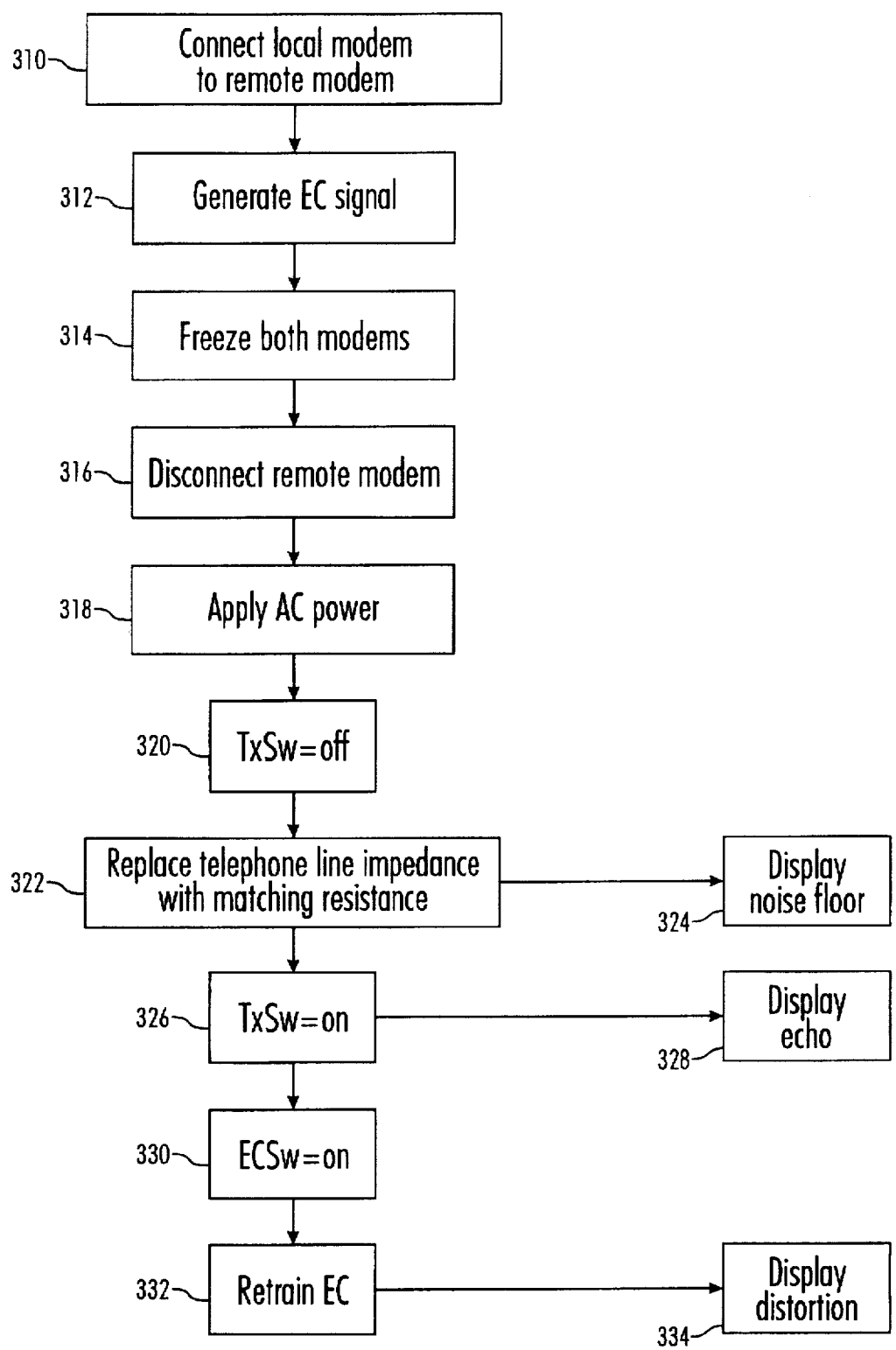
FIG. 3 is a flow chart describing the measurement system according to an embodiment of the invention.

Initially, a known receive level (e.g. −10 dBm) is applied to the DAA by connecting a signal generator or other signal source to the modem DAA. The application program 116 running on the host computer 112 is then calibrated by manipulating the value of the calibration constant C, such that the display of the signal arriving from the DP reads exactly −10 dBm. According to preferred dBm meter embodiments, the following steps are then performed, as referenced in FIG. 3:

1. A remote modem is coupled to the local modem 110. (Step 310) The two modems are allowed to handshake and make a connection. During the handshake both modems train their ECs. The training must take place in order for the EC to generate the appropriate echo canceling signal. (Step 312)

2. Modem functions for both modems are frozen at step 314 following the handshake and training. A set of commands is sent by the host computer to both modems to cause the modems to stop transmitting and lock the ECs to the last value.

3. The remote modem is disconnected (Step 316) from the setup by physically turning off the modem under test from the telephone line. Alternatively, this modem may remain connected to indicate problems with particular line conditions.

4. A known AC signal source having a power output of −10 dBm is connected to the DAA. (Step 318)

5. TxSw and ECSw are OFF, i.e., open. (Step 320) Since there is no data transmission, there is also no echo.

6. The host computer reads the received signal, and converts the digital value to −10 dBm. The output is then displayed on the computer screen 114. Because the nature of the DP and the hardware around it is linear, the linearity of the dBm meter is assured.

Preferably, the above calibration sequence is performed only once, before status measurements are taken.

b. Measuring the Noise Floor

1. Perform numbered steps 1 through 3 above.

2. Replace the telephone line connection with a resistor which matches the internal impedance of the modem. (Step 322)

3. A dBm value should appear on the host computer display 114. (Step 324) This value represents the noise level within the modem arrangement, without any external influences from the telephone line. The Rx values are read, RMS calculated, converted to dBm, calibrated, and then displayed in dBm on the display screen.

At this point, the DP 118 is not transmitting any signals. As a consequence, no echo will be present in the system, and the output of the EC 122 is not effectively connected to any components within the modem. Thus, the only signal present at the input 131 of the DP 118 will be noise. This noise comprises the noise floor of the modem. It has been found that typical noise floor values are approximately −80 dBm or less.

c. Measuring Echo Generated by the Hybrid

1. Continue with the same connections after measuring the noise floor, described above.

2. Close TxSw 124. (Step 326)

3. Read the resultant dBm value displayed (step 328) on the computer 112. The dBm value represents the echo generated at the hybrid. That is, because the modem is transmitting its typical spectrum of frequencies, and because the matching resistor is connected to the modem (see item b(2) above), there is no mismatch between the telephone line and the modem DAA.

The only signal arriving at the DP 118 will be the echo created at the hybrid. The fact that noise and distortion may also be present does not affect this measurement because both are negligible as compared to the echo, which could amount to −40 dBm.

d. Measuring Distortion

1. Close ECSw 126 (step 330), and allow the EC to train to the new condition at step 332. Such training may be accomplished, for example, by closing TxSw 124 and providing a command to the DP to revise the EC coefficients.

2. Read the dBm display. (Step 334) The measurement will reflect the sum of the distortion and noise. At this point, an aggregate of the noise floor, distortion, and uncanceled echo, which may include any residual echo that the EC failed to cancel, will be read. In general, it has been found that the displayed measurement can be deemed to represent primarily distortion, since the noise and uncanceled echo are typically substantially smaller than distortion.

Typically, the distortion will be approximately 10 dB to 20 dB greater than the noise. That is, it has been found that the noise is negligible relative to the distortion. Thus, this measurement represents the total distortion created anywhere in the system.

3. Interpreting the test results

In operation, as indicated in FIG. 1, the analog signal received across the telephone line 134 is presented to the DP 118 via the A/D 146 and the DAA 132. At the DP, the signal will include several components, such as the actual receive signal coming from the telephone line; the echo contributions produced in the DAA; and the distortion reflected back from the hybrid transformer. In addition, noise will be generated throughout the system. For example, noise may be created in copper traces present on the printed circuit board, as well as by many different electronic components residing on the board. In fact, it has been found that the individual modem components play a major part in generating noise due to high current levels which flow through the modem electronics.

Thus, embodiments of the present invention allow the user to quickly, easily, and effectively examine and evaluate the status of the internal workings of the modem arrangement, and thereby provide for immediate rectification of any problems that may exist. As expected component outputs are known, the electronics technician can easily analyze and compare the actual results with the expected or desired results.

4. Conclusion

Thus, by configuring the modem as a dBm meter, values of the noise, echo and distortion can be usefully displayed to the system designer or technician. In preferred embodiments, upon an input keyboard command from a user, the program installed in the host computer sends appropriate control signals to the DP 118 via the microcontroller 140, reads the data contained in the DP registers which includes the receive, incoming data from the telephone line and hybrid and, ultimately, calculates the dBm values. The dBm values are then displayed for the user's evaluation. Preferably, the application program running on the host computer is capable of performing the above-described tests sequentially, but reporting the results simultaneously.

The present invention is a substantial simplification over conventional testing and evaluation schemes. By utilizing the inherent capabilities in a modem and host computer arrangement, the claimed testing apparatus and method provides for efficient and simple measurement and evaluation of noise, echo, and distortion. Although the present invention has been described in terms of a specified embodiment, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A system for evaluating the operation of a data pump (DP) having associated distortion, noise, and echo, the DP including an input receive line and an output transmit line, wherein the DP is coupled to a telephone line such that the DP receives and transmits signals across the telephone line, the system comprising:

a computer coupled to the DP for providing control commands to the DP and for reading and processing the receive and transmit signals;

an echo canceler (EC) coupled to the DP, along the transmit and receive lines, the EC for generating an echo canceling signal for canceling echo;

a transmit switch for connecting and disconnecting the DP from the transmit line, wherein the DP is disconnected when the transmit switch is open and the DP is connected to the transmit line when the transmit switch is closed;

an EC switch for connecting and disconnecting the EC from the receive line, wherein the EC is disconnected when the EC switch is open and the EC is connected to the receive line when the EC switch is closed;

reading means for reading the output transmit signal of the DP; and display means coupled to the computer for displaying the receive signal level measured at the DP.

2. The system of claim 1, wherein the echo canceling signal is defined by at least one adaptive echo canceling coefficient, the system further comprising an EC freeze switch coupled between the EC and the receive line, for controlling the at least one adaptive echo canceling coefficient.

3. A system for evaluating the operation of a modem having associated distortion, noise, and echo, the modem including a controller, wherein the modem is coupled to a telephone line via tip and ring lines, such that the modem receives and transmits signals across the telephone line, the system comprising:

a computer coupled to the modem for providing control commands to the modem controller and for reading and processing the modem receive and transmit signals;

a data pump (DP) coupled to the modem, the DP having:
an input receive line and an output transmit line,
an echo canceler (EC) coupled between the DP, along the transmit and receive lines, the EC for generating an echo canceling signal for canceling echo,
a transmit switch for connecting and disconnecting the DP from the transmit line, wherein the DP is disconnected when the transmit switch is open and the DP is connected to the transmit line when the transmit switch is closed, and
an EC switch for connecting and disconnecting the EC from the receive line, wherein the EC is disconnected when the EC switch is open and the EC is connected to the receive line when the EC switch is closed;

process means for reading and processing the output receive signal of the DP; and display means coupled to the computer for displaying the receive signal level measured at the DP.

4. The system of claim 3, further comprising:
means for applying a predetermined power level to the modem; and
means for calibrating the computer to the predetermined power level, wherein the predetermined power level is measured as the output receive signal, and displayed by the display means.

5. The system of claim 4, wherein the modem has an associated internal impedance, the system further comprising impedance means coupled to the modem, the impedance means having an impedance which matches the internal impedance of the modem, such that, when the EC switch and the transmit switch are open, the output receive signal of the DP represents noise, as read by the process means.

6. The system of claim 5, wherein when the transmit switch is closed such that the DP is connected to the telephone line via the transmit line, the output receive signal of the DP represents echo, as read by the process means.

7. The system of claim 5, wherein when the transmit and EC switches are closed, the output receive signal of the DP represents distortion and noise, as read by the process means.

8. The system of claim 3, wherein the output of the process means has a linear response.

9. The system of claim 3, wherein the transmit switch is a software switch, controlled by the computer.

10. The system of claim 3, wherein the transmit switch is a hardware switch.

11. A testing apparatus for evaluating the operation of a local modem having associated distortion, noise, and echo, the modem including a microcontroller and a data access arrangement (DAA) coupled to a telephone line, the DAA for providing transmit and receive lines between the modem and the telephone line, wherein the local modem receives signals across the receive line and transmits signals across the transmit line, further wherein echo is generated in the DAA, the system comprising:

a computer coupled to the local modem, the computer having program means for providing control commands to the modem microcontroller and for reading and processing the modem receive and transmit signals;

a data pump (DP) coupled to the modem, the DP including:
an echo canceler (EC) coupled between the transmit and receive lines and the DAA, for generating an echo canceling signal for canceling echo,
an echo canceler switch (ECSw) for connecting and disconnecting the EC to and from the receive line, respectively, and
a transmit switch (TxSw) for connecting and disconnecting the DP to and from the transmit line, respectively, wherein the program means controls the opening and closing of the ECSw and the TxSw;

measuring means for measuring the receive signal at the DP; and display means coupled to the computer for displaying the receive signal level measured at the DP.

12. The apparatus of claim 11, further comprising an analog interface (A/I) for analog-to-digital and digital-to-analog conversion of the received and transmitted signals, respectively, the A/I being coupled between the DP and the DAA.

13. The apparatus of claim 11, further comprising calibrating means for calibrating the program means.

14. The apparatus of claim 13, wherein the calibrating means comprises:

a remote modem coupled to the local modem across the telephone line, the remote modem having an associated EC, wherein the local and remote modems transmit signals to each other;

means for training the ECs of the local modem and the remote modem, wherein a handshake operation is performed between the local and remote modems such that the local EC generates an appropriate echo canceling signal;

means for commanding the local and remote modems to stop transmitting; and a power supply having a predetermined power output coupled to the local modem, for calibrating the program means to read a nominal value representing the predetermined power output.

15. The apparatus of claim 14, wherein the echo is defined by changing echo conditions, further wherein the means for training includes update means for adaptively controlling the echo canceling signal to accommodate the changing echo conditions.

16. The apparatus of claim 14, wherein the telephone line and the modem have associated impedances, the system further comprising:

means for disconnecting the remote modem from the telephone line; and impedance means coupled to the DAA, for matching and compensating for the impedance of the telephone line, such that no echo is generated at the DAA, wherein when the EC is disconnected from the DP, noise is measured by the measuring means as the receive signal at the DP, the noise having a representative noise level which is displayed by the display means.

17. The apparatus of claim 14, further comprising:

means for disconnecting the remote modem from the telephone line; and means for instructing the program means to cause the TxSw to close, such that the transmit line connects the DP to the A/I, wherein any echo generated at the DAA is measured by the measuring means as the receive signal at the DP, the echo having a representative echo level which is displayed by the display means.

18. The apparatus of claim 17, wherein the echo level has an associated phase, further comprising means for instructing the program means to cause the ECSw to close, such that the local EC is retrained to produce an echo canceling signal equivalent to the echo, but opposite in phase, wherein combined distortion and noise are measured together by the measuring means as the receive signal at the DP.

19. The apparatus of claim 16, wherein the impedance means comprises a resistor.

20. The apparatus of claim 11, wherein the measuring means measures the receive signal in units of dBm, and the display means displays the measured receive signal level in dBm.

21. A method of evaluating the operation of a data pump (DP) having associated distortion, noise, and echo, wherein the DP is provided with an input receive line and an output transmit line for receiving and transmitting, respectively, receive and transmit signals, the DP including an echo canceler (EC) coupled to the receive line, further wherein the DP is coupled to a telephone line, the method comprising the steps of:

providing control commands to the DP via a computer;

reading and processing the receive and transmit signals according to the control commands;

generating an echo canceling signal for canceling echo;

connecting and disconnecting the DP from the transmit line in accordance with the control commands;

connecting and disconnecting the EC from the receive line in accordance with the control commands, wherein when the EC is connected to the receive line, the echo canceling signal cancels the echo associated with the DP;

measuring the output transmit signal at the DP; and displaying the measured output transmit signal level.

22. The method of claim 21, further comprising the steps of:

applying a predetermined power level to the DP; and calibrating the computer to the predetermined power level, wherein the predetermined power level is measured as the output transmit signal, and displayed by the display means.

23. A method of evaluating the operation of a modem having associated distortion, noise, and echo, the modem including a microcontroller, an echo canceler (EC), and a data pump (DP) having an input receive signal and an output transmit signal, wherein the modem is coupled to the public switched telephone network via a telephone line, such that the modem receives and transmits signals across the telephone line, the method comprising the steps of:

providing control commands to the modem microcontroller via a computer;

reading and processing the modem receive and transmit signals according to the control commands;

generating an echo canceling signal for canceling echo;

connecting and disconnecting the DP from the transmit line in accordance with the control commands;

connecting and disconnecting the EC from the receive line in accordance with the control commands, wherein when the EC is connected to the receive line, the echo canceling signal cancels the echo associated with the modem;

measuring the output receive signal at the DP; and displaying the measured output receive signal level.

24. The method of claim 23, further comprising the steps of:

applying a predetermined power level to the modem; and calibrating the computer to the predetermined power level, wherein the predetermined power level is measured as the output receive signal, and displayed by the display means.

25. The method of claim 24, wherein the modem has an associated internal impedance, further comprising the step of matching the internal impedance of the modem such that, when the EC switch and the transmit switch are open, the output receive signal of the DP represents noise, as measured by the measuring means.

26. The method of claim 25, further comprising the step of measuring the output receive signal of the DP as distortion and noise when DP is connected to the transmit line and the EC is connected to the receive line.

27. The method of claim 26, wherein the modem represents a local modem, the method further comprising the steps of:

coupling a remote modem to the local modem across the telephone line, the remote modem having an associated EC; and transmitting signals between the remote modem and the local modem;

training the ECs of the local modem and the remote modem, wherein a handshake operation is performed between the local and remote modems such that the local EC generates the appropriate echo canceling signal;

commanding the local and remote modems to stop transmitting;

supplying a predetermined power level to the local modem; and calibrating the computer to read a nominal value representing the predetermined power output.

28. The method of claim 27, further comprising the steps of:

disconnecting the remote modem from the telephone line; and connecting the DP to the transmit line via a data access arrangement (DAA), the DAA generating an associated echo, such that any echo generated at the DAA is measured by the measuring means as the receive signal at the DP, the echo having a representative echo level; and displaying the echo level.

* * * * *